US008550896B2

(12) United States Patent
Bennett

(10) Patent No.: US 8,550,896 B2
(45) Date of Patent: Oct. 8, 2013

(54) GAMING MACHINE WITH SPECIAL SYMBOL

(75) Inventor: Nicholas Luke Bennett, Lane Cove (AU)

(73) Assignee: Aristocrat Technologies Australia Pty Ltd. (AU)

( * ) Notice: Subject to any disclaimer, the term of this patent is extended or adjusted under 35 U.S.C. 154(b) by 118 days.

(21) Appl. No.: 12/688,386

(22) Filed: Jan. 15, 2010

(65) Prior Publication Data

US 2010/0120511 A1 May 13, 2010

Related U.S. Application Data

(63) Continuation of application No. 10/296,078, filed as application No. PCT/AU01/00552 on May 15, 2001, now Pat. No. 7,674,173.

(30) Foreign Application Priority Data

May 22, 2000 (AU) ....................................... PQ7664

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/20; 463/16; 463/17; 463/18; 463/19; 463/25

(58) Field of Classification Search
USPC ................................................ 463/16–20, 25
See application file for complete search history.

(56) References Cited

U.S. PATENT DOCUMENTS

| | | | | |
|---|---|---|---|---|
| 4,824,121 | A | 4/1989 | Beall et al. | |
| 5,318,319 | A | 6/1994 | Jones et al. | |
| 5,833,537 | A | 11/1998 | Barrie | |
| 5,971,397 | A | 10/1999 | Miguel et al. | |
| 5,975,530 | A | 11/1999 | Gary | |
| 5,980,384 | A | 11/1999 | Barrie | |
| 6,089,571 | A | 7/2000 | Cho | |
| 6,279,912 | B1 | 8/2001 | Martin et al. | |
| 6,439,993 | B1 | 8/2002 | O'Halloran | |
| 6,558,253 | B1 * | 5/2003 | DeSimone et al. | 463/20 |
| 2003/0032470 | A1 * | 2/2003 | Weiss et al. | 463/16 |

FOREIGN PATENT DOCUMENTS

| | | | |
|---|---|---|---|
| AU | 199917318 | A1 * | 9/1999 |
| EP | 950998 | A | 10/1999 |
| WO | 9732285 | A | 9/1997 |
| WO | WO 97/32285 | * | 9/1997 |

OTHER PUBLICATIONS

Int'l Search Reported issued Jun. 14, 2001.

* cited by examiner

*Primary Examiner* — Omkar Deodhar
*Assistant Examiner* — Adetokunbo O Torimiro
(74) *Attorney, Agent, or Firm* — McAndrews, Held & Malloy, Ltd.

(57) ABSTRACT

A gaming machine having a display means and a game control means arranged to control images displayed on the display means, the game control means being arranged to play a game wherein at least one random event is caused to be displayed on the display means and, if a predefined winning event occurs, the machine awards a prize, wherein, when a special symbol is carried by a symbol-carrying element into a display position on the display means, the special symbol substitutes as more than one occurrence of a standard symbol of the game.

14 Claims, 7 Drawing Sheets

GAMING MACHINE WITH SPECIAL SYMBOL

RELATED APPLICATIONS

This application claims priority to, and is a continuation of U.S. patent application Ser. No. 10/296,078 having a filing date of Nov. 19, 2002, which is the National Stage entry of International Application PCT/AU01/00552, having a filing date of May 15, 2001, which claims priority to Australian Patent Application PQ7664, having a filing date of May 22, 2000, the contents of which are incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to a gaming machine. More particularly, the invention relates to a gaming machine and to an improvement to a game played on such a gaming machine.

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the players as a mechanism for improving sales, retaining customers and attracting new customers.

BRIEF SUMMARY OF THE INVENTION

According to the invention, there is provided a gaming machine having a display means and a game control means arranged to control images displayed on the display means, the game control means being arranged to play a game wherein at least one random event is caused to be displayed on the display means and, if a predefined winning event occurs, the machine awards a prize, the gaming machine being characterized in that, when a special symbol is carried by a symbol-carrying element into a display position on the display means, the special symbol substitutes as more than one occurrence of a standard symbol of the game.

At least one applicable standard symbol may have to be present together with the special symbol in a winning combination in order for the special symbol to substitute.

When more than one special symbol occurs in a winning combination, each special symbol may substitute for more than one occurrence of a standard symbol of the game provided that the maximum number of symbols does not exceed the maximum number of symbols in an applicable paytable of the game.

Prizes may be awarded for specific combinations of special symbols.

The special symbol of the invention may be applicable in respect of any type of game played on gaming machines. However, for ease of explanation, the invention will be described with reference to spinning reel games and, more particularly, gaming machines having video simulations of spinning reels.

The special symbol may appear on a standard reel of the game. Instead, the special symbol may appear on a dedicated, separate reel. For example, a spinning reel game may have a video simulation of five spinning reels. Then, the special symbol may be carried on a sixth reel, the sixth reel not having any of the standard reel symbols.

It will be appreciated that, for a card game, special cards could be added to the deck or, instead or in addition, a certain card or cards in the deck could be designated to act as the special cards in addition to their other functions. Similarly, in respect of ball-type games, such as Keno, Bingo or Pachinko, special balls may be added to the set of balls or certain of the standard balls may double as the special balls.

BRIEF DESCRIPTION OF SEVERAL VIEWS OF THE DRAWINGS

The invention is now described by way of example with reference to the accompanying diagrammatic drawings in which.

DETAILED DESCRIPTION OF THE INVENTION

Figure 1:
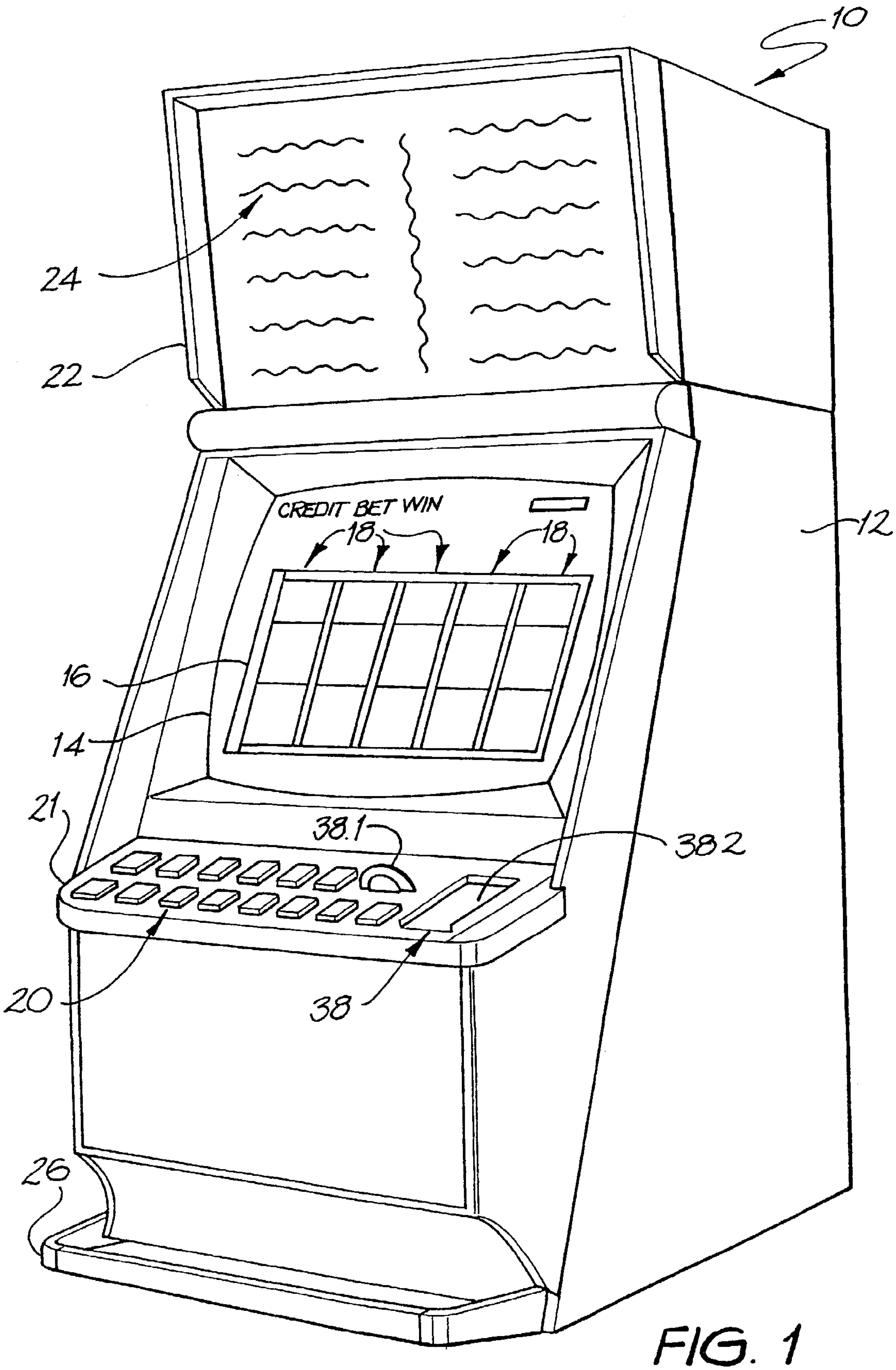
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The preferred form of the game 16 is a spinning reel game which simulates the rotation of a number of spinning reels 18. It will, however, be appreciated that the invention is equally applicable to other types of games such as card games or ball games such as Keno, or the like. A midtrim 20 of the machine 10 houses a bank 21 of buttons for enabling a player to play the game 16. The midtrim 20 also houses a credit input mechanism 38 including a coin input chute 38.1 and a bill collector 38.2.

The machine 10 includes a top box 22 on which artwork 24 is carried. The artwork 24 includes paytables, details of bonus awards, etc.

A coin tray 26 is mounted beneath the console 12 for cash payouts from the machine 10.

Figure 2:
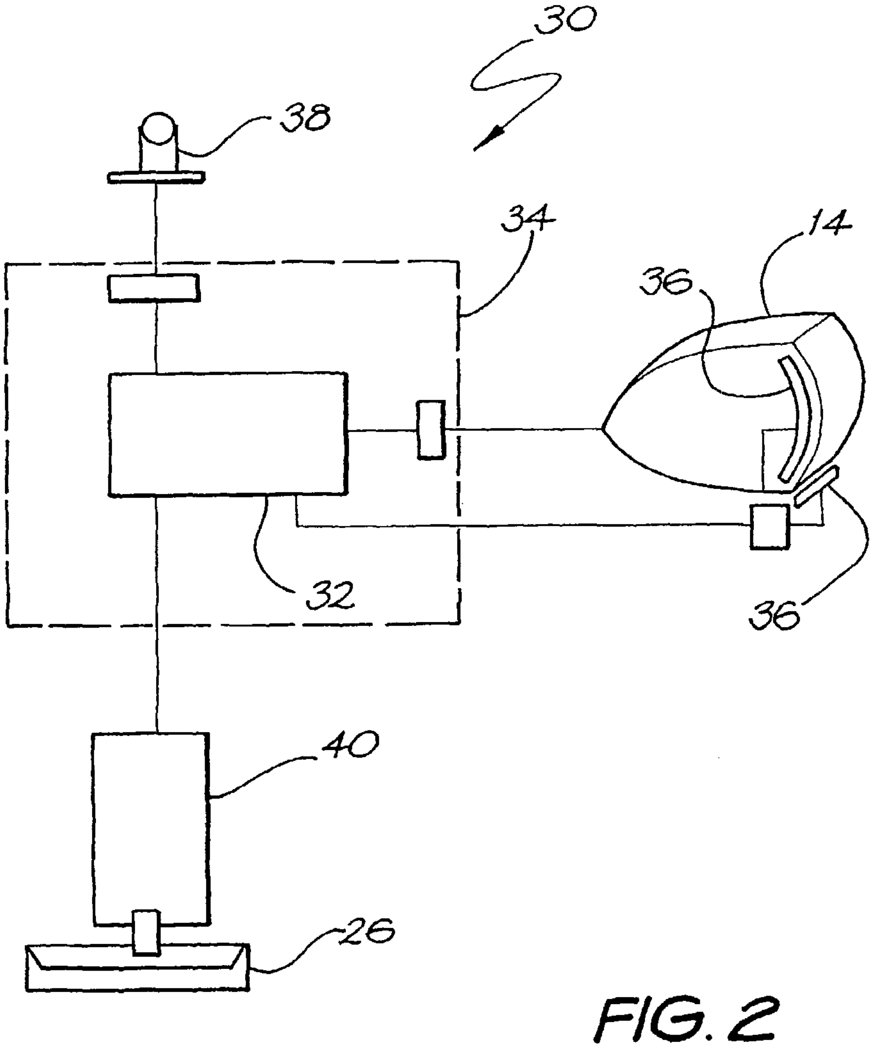
FIG. 2 shows a block diagram of a control circuit of the gaming machine.

Referring now to FIG. 2 of the drawings, a control means or control circuit 30 is illustrated. A program which implements the game and user interface is run on a processor 32 of the control circuit 30. The processor 32 forms part of a controller 34 which drives the screen of the video display unit 14 and which receives input signals from sensors 36. The sensors 36 include sensors associated with the bank 21 of buttons and touch sensors mounted in the screen 16. The controller 34 also receives input pulses from the mechanism 38 indicating that a player has provided sufficient credit to commence playing. The mechanism 38 may, instead of the coin input chute 38.1 or the bill collector 38.2, or in addition thereto, be a credit card reader (not shown) or any other type of validation device.

Finally, the controller 36 drives a payout mechanism 40 which, for example, may be a coin hopper for feeding coins to the coin tray 26 to make a pay out to a player when the player wishes to redeem his or her credit.

The invention relates to the use of a special symbol in the game where the special symbol performs a particular function. Thus, the special symbol performs that function when it appears on the screen. Hence, in the case of a spinning reel game, the special symbols will be carried on the reel strips to be displayed at random intervals.

In this invention, a special symbol 122, indicated in the drawings as a "Bonus" symbol, is provided. When this symbol 122 is spun up in a winning combination in a game, as shown by screen display 120, the symbol 122 substitutes as more than one occurrence of a particular standard symbol, preferably, two of that symbol. The only exception will be if the total number of symbols in the combination ends up being more than the maximum number of symbols on the paytable in which case the prize for the maximum number of symbols will be paid.

In the following description, it is assumed that the game 16 is a standard spinning reel game with prizes paying when they appear in left-to-right and/or right-to-left combinations on a payline. As illustrated, there are five reels with three standard horizontal paylines applicable. Coinciding wins on a payline will be added. However, for the special symbol 122 to substitute in a combination of other standard symbols, there must be at least one of the actual, standard symbols present in the combination and not just special symbols.

Figure 3A:
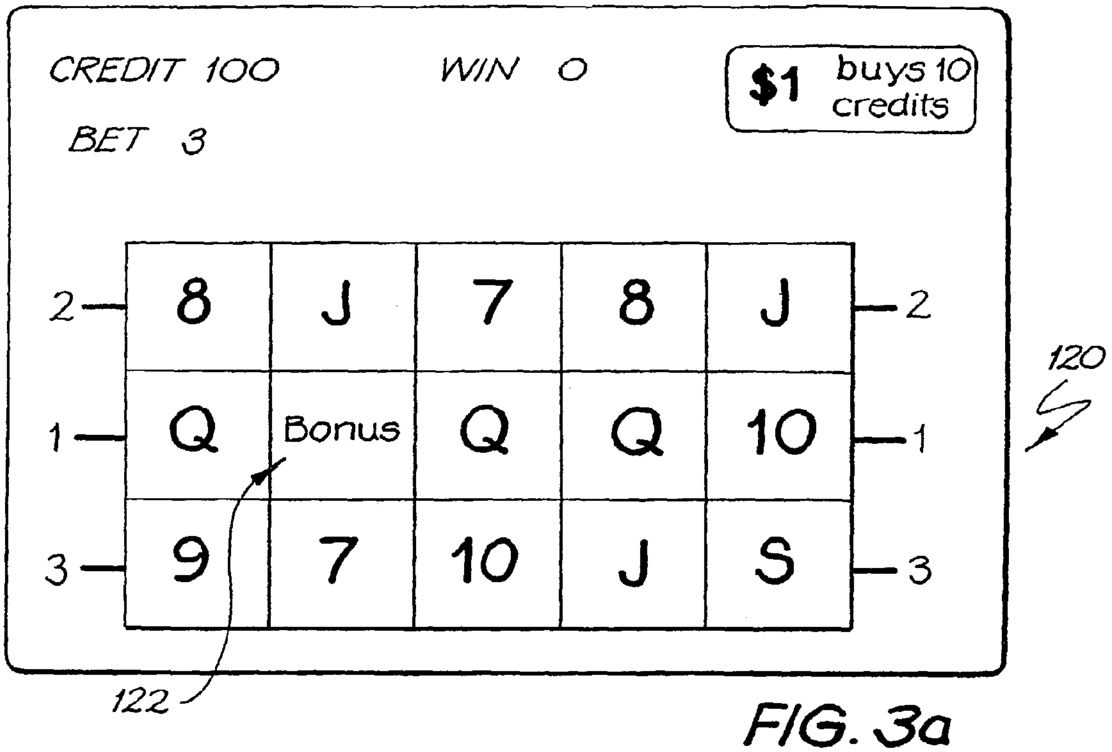
FIGS. 3*a* to 3*e* show screen displays of variations of a first embodiment of a game played on the gaming machine of FIG. 1.

In the game illustrated in FIG. 3*a* of the drawings, a winning combination exists on payline one. As described above, the symbol 122 substitutes as two of the standard symbols. Accordingly, a prize is paid for 5×Q on payline one.

Figure 3B:
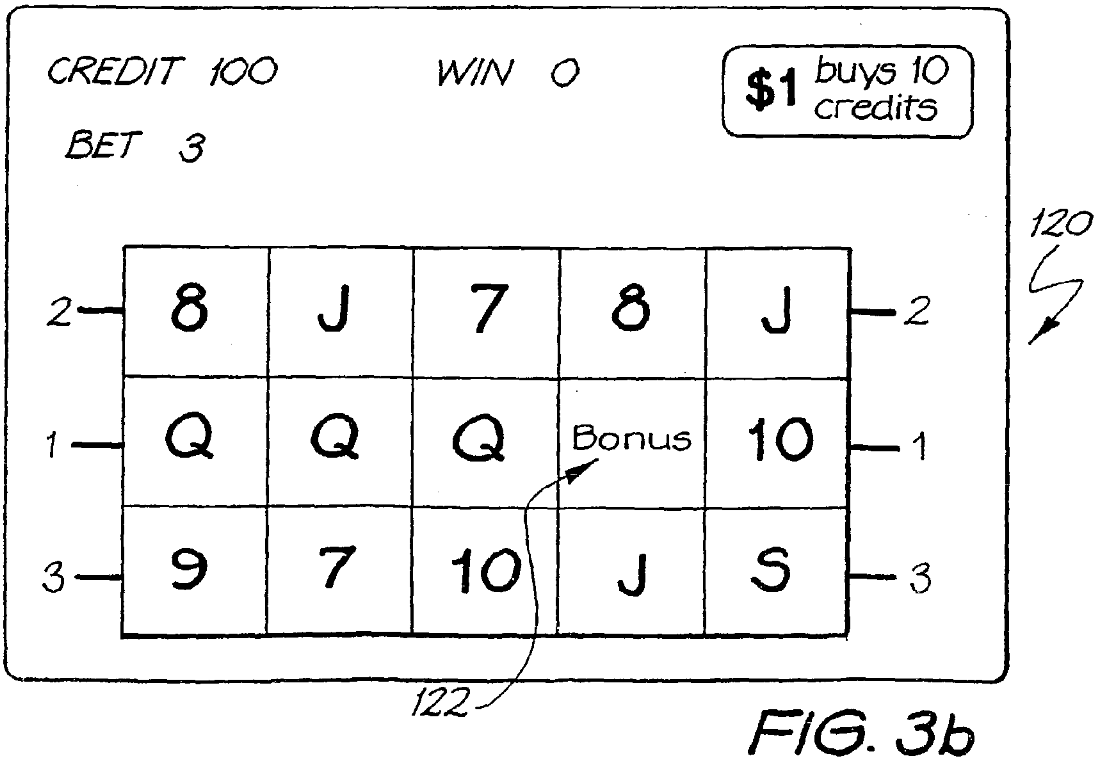

If, however, the symbol 122 appeared on the fourth reel, rather than the second reel, as shown in FIG. 3*b*, a prize would be paid for 5×Q as well as 3×TEN, the latter paying from right-to-left.

Figure 3C:
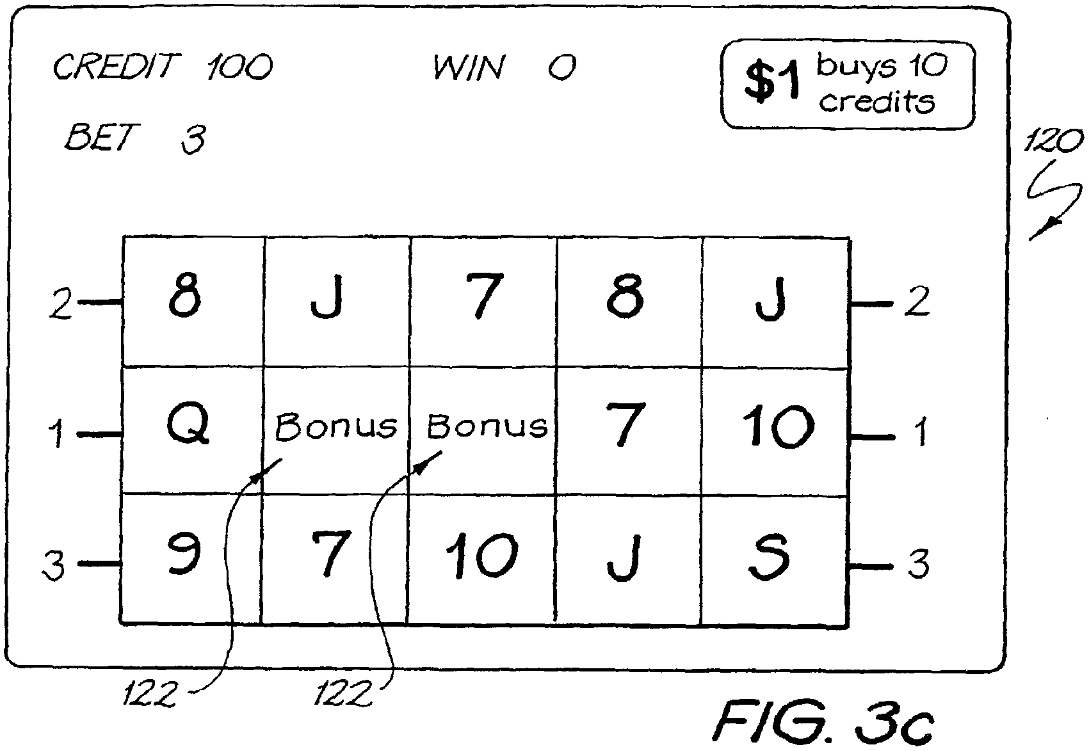

In the case of two special symbols 122 appearing side-by-side as shown in FIG. 3*c* of the drawings, a prize is paid for 5×Q due to each symbol 122 substituting for two of the standard symbols.

Figure 3D:
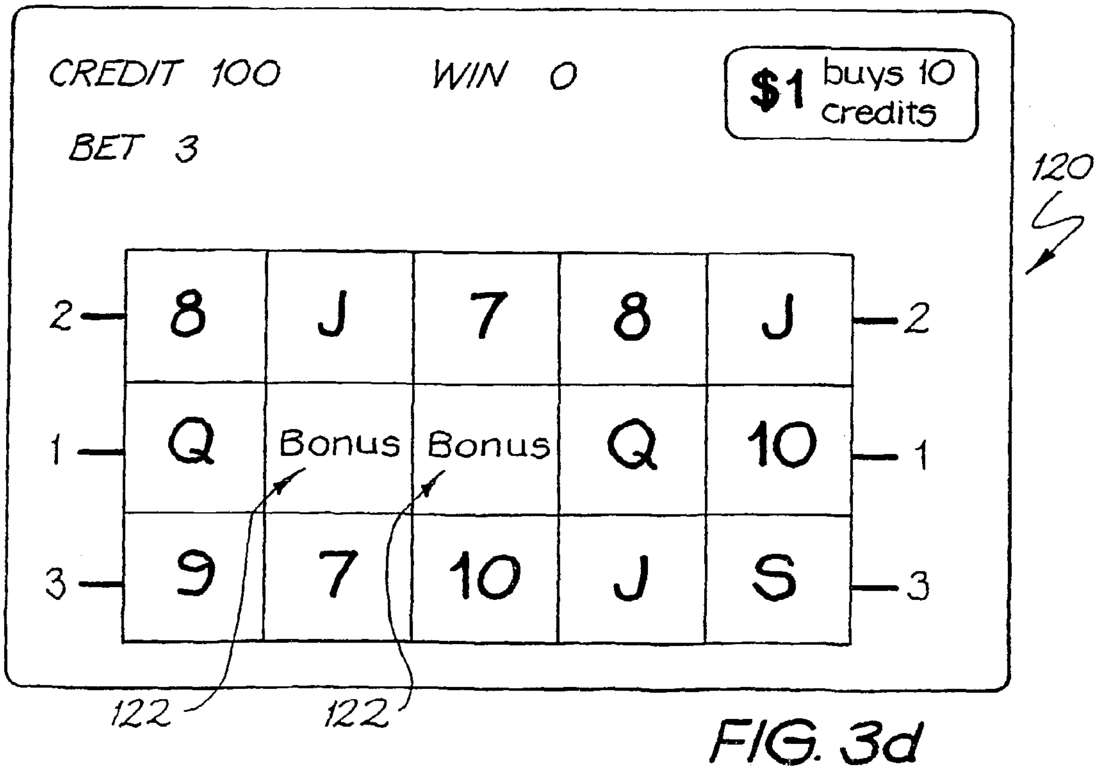

However, in the scenario illustrated in FIG. 3*d* of the drawings, theoretically there are six Q symbols on payline one. However, as a prize is only payable for a maximum of five Q symbols, a win will be awarded in respect of 5×Q symbols.

Figure 3E:
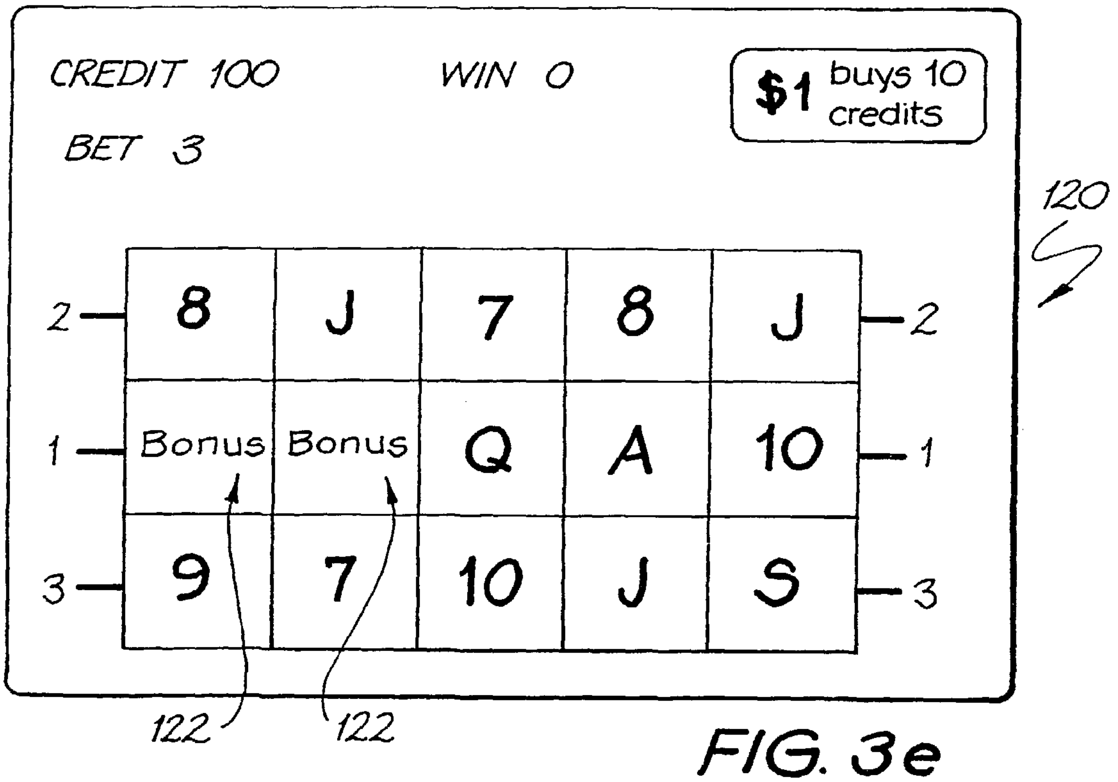

In the embodiment illustrated in FIG. 3*e* of the drawings, a prize is paid for 5×Q on payline one. Note that the special symbols 122 do not substitute as four of a kind for the rest of the set of standard symbols because there must be at least one of the actual symbols present in the combination for the prize to be paid. Hence the special symbols can only substitute for the symbol Q in the illustrated combination. It will be appreciated that if the machine paid a prize for an "any" combination, the situation would be different.

Figure 4:
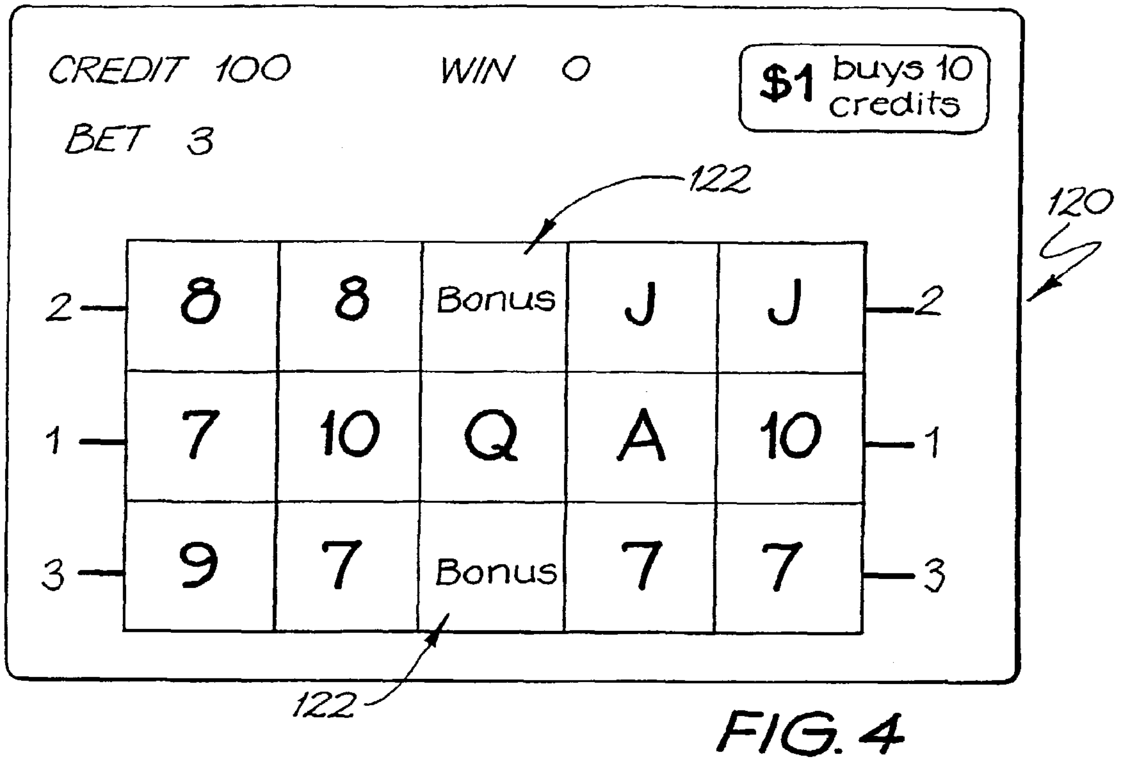
FIG. 4 shows a screen display of a second embodiment of the game.

In another embodiment of the invention, the special symbol 122 may appear only on the centre reel, i.e. reel three. Then, for a left-to-right and/or right-to-left paying game the special symbol will only serve to improve combinations of at least three of a kind to at least four of a kind. In other words, it would not be possible for the special symbol 122 to appear with only one other symbol to give a three of a kind win. Also, it would not then be possible to get more than one special symbol in a winning combination. Hence, as illustrated in FIG. 4 of the drawings a win will be paid for the combination of 4 ×8 and 4×J on payline two as well as 5×7 on payline three.

Figure 5:
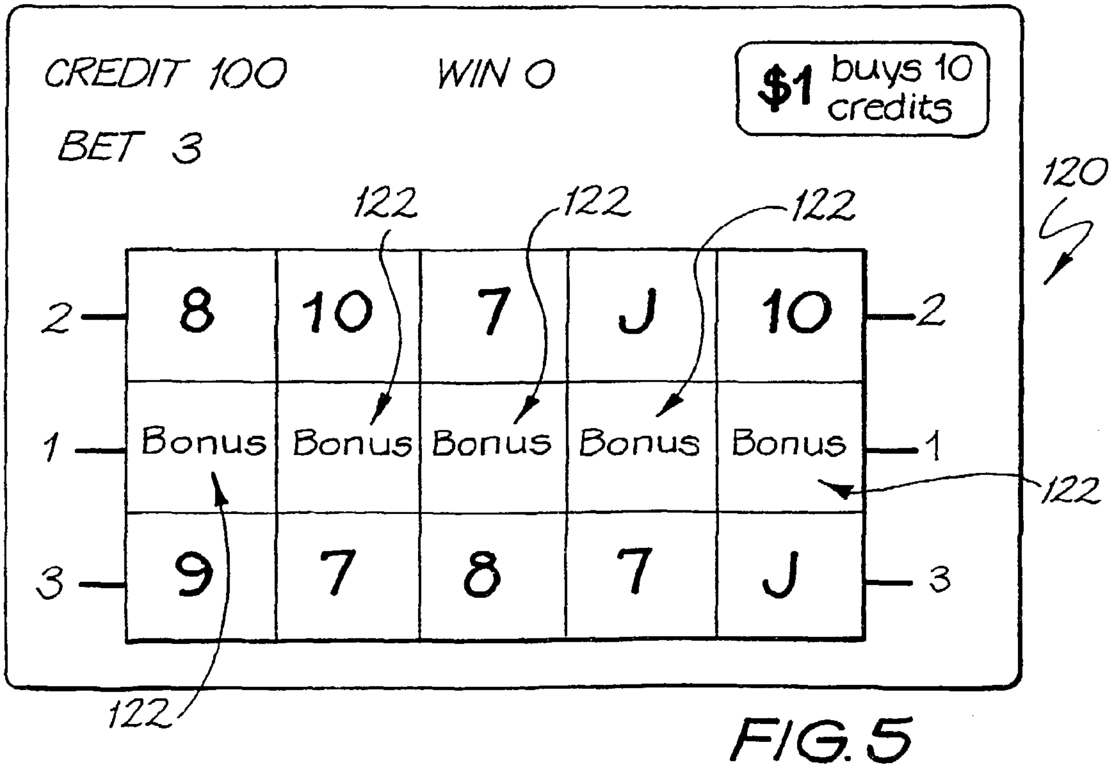
FIG. 5 shows a screen display of a third embodiment of the game.

Prizes may also be given for specific combinations of special symbols 122 in addition to the special substitute wins. In this case, the symbol 122 will be acting as a symbol in its own right and will not represent more than one of itself. In the example illustrated in FIG. 5 of the drawings, a prize is paid for 5×Bonus, the prize being substantially higher than the prize for five of any other symbol.

Figure 6:
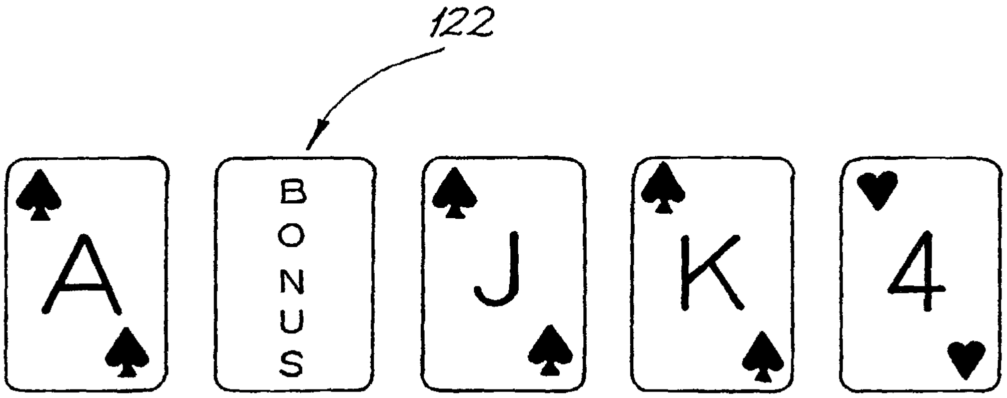
FIG. 6 shows a screen display of a fourth embodiment of the game.

FIG. 6 shows the application of the special symbol 122 to a card game. In this embodiment, the special symbol substitutes as more than one card symbol towards a specific paying combination. In the illustrated example, the presence of the special symbol 122 results in a Royal Flush pay because the special symbol 122 substitutes as both a Queen of spades and a Ten of spades in the one hand.

Note that the special symbol 122 could also apply to a ball game such as Keno, or the like.

Hence, it is an advantage of the invention that a special symbol is provided which, it is believed, will enhance player interest It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming machine comprising a display and a game controller, the game controller being arranged to:

select a plurality of symbols to be displayed in respective ones of a plurality of display positions arranged on the display, the plurality of symbols being selected from a set of symbols including at least one special symbol;

play a game based on the selected symbols, wherein when a game outcome corresponds to a predefined winning outcome, the gaming machine is configured to award a prize, the predefined winning outcome comprising a predetermined pattern formed by a plurality of the selected symbols;

wherein, when a special symbol is selected for display as part of the predefined winning outcomes, the special symbol substitutes as a plurality of the symbol displayed in at least one adjacent display position such that the predefined winning outcome that the special symbol is displayed as part of is enhanced; and wherein each predefined winning outcome comprises a maximum number of symbols such that the substitution of the special symbol is limited by the maximum number of symbols.

2. The gaming machine of claim 1 in which at least one applicable standard symbol must be present together with the special symbol in a winning combination in order for the special symbol to substitute.

3. The gaming machine of claim 1 in which, when more than one special symbol occurs in a winning combination, each special symbol substitutes for more than one occurrence of a standard symbol of the game up to an extent in which the game outcome includes a maximum number of symbols in an applicable paytable of the game.

4. The gaming machine of claim 1 in which prizes are awarded for specific combinations of special symbols.

5. The gaming machine of claim 1 in which the special symbol appears on a standard symbol-carrying element of the game.

6. The gaming machine of claim 1 in which the special symbol appears on a dedicated, separate symbol-carrying element.

7. A gaming machine, comprising:

a display configured to display a game outcome comprising a plurality of symbols in a plurality of display positions; and a game controller configured to select the plurality of symbols for the game outcome from a set of symbols comprising at least one special symbol and a plurality of standard symbols, determine whether the game outcome includes one or more predefined winning combinations of standard symbols by considering each special symbol in a respective symbol combination of the game outcome to represent a plurality of standard symbols in the respective symbol combination, and award a prize if the game outcome includes one or more of the predefined winning combinations of standard symbols.

8. The gaming machine of claim 7, wherein the game controller is further configured to consider each special symbol in a respective symbol combination of the game outcome to represent a plurality of standard symbols only if the respective symbol combination includes at least one standard symbol.

9. The gaming machine of claim 7, wherein the game controller is further configured to consider each special symbol in a respective symbol combination of the game outcome to represent a plurality of standard symbols, but limit the resulting symbol combination to a maximum number of symbols in an applicable paytable of the game.

10. The gaming machine of claim 7, wherein the game controller is further configured to award prizes for specific combinations of special symbols.

11. The gaming machine of claim 7, wherein the display comprises one or more symbol-carrying elements and the special symbol appears on at least one of the symbol-carrying elements.

12. The gaming machine of claim 7, wherein the display comprises a plurality symbol-carrying elements and only one of the symbol-carrying elements includes a special symbol.

13. The gaming machine of claim 12, wherein the plurality of symbol-carrying elements comprise a plurality of spinning reels.

14. The gaming machine of claim 12, wherein the display comprises a video display and the plurality of symbol-carrying elements comprise a plurality of spinning reels depicted upon the video display.

* * * * *